Dec. 6, 1927.
F. H. BANBURY
1,651,502
HEAT EXCHANGE ROLL
Filed June 15, 1926  2 Sheets-Sheet 2
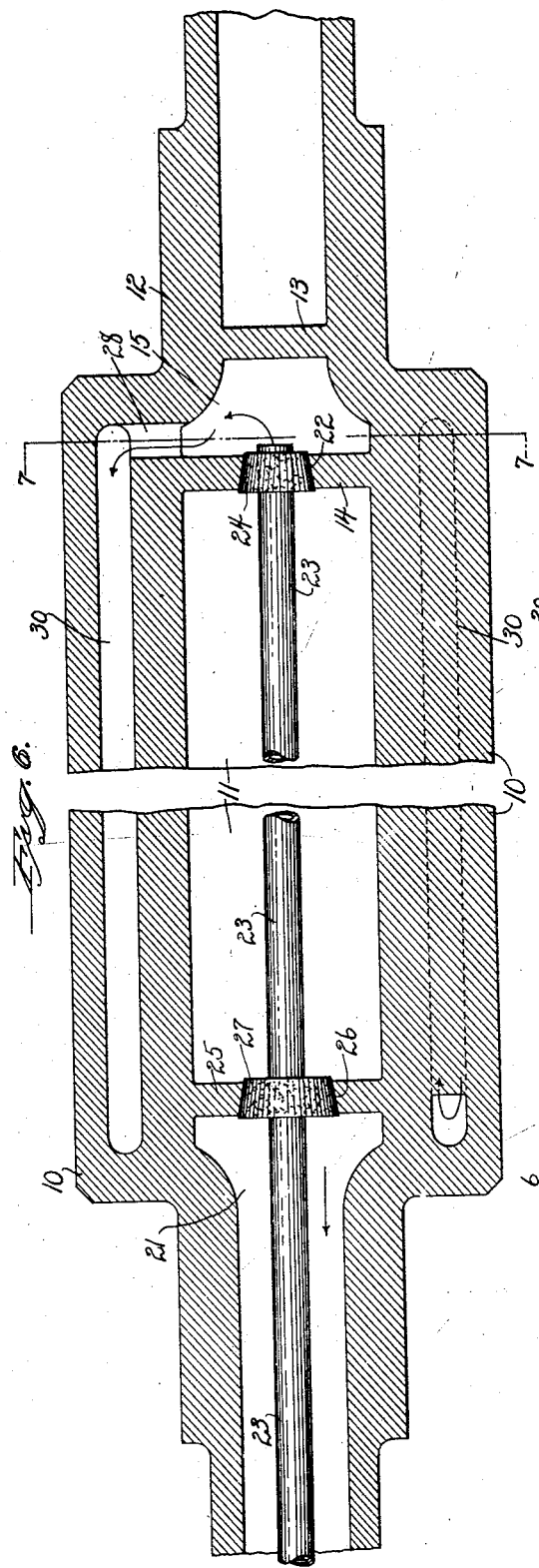
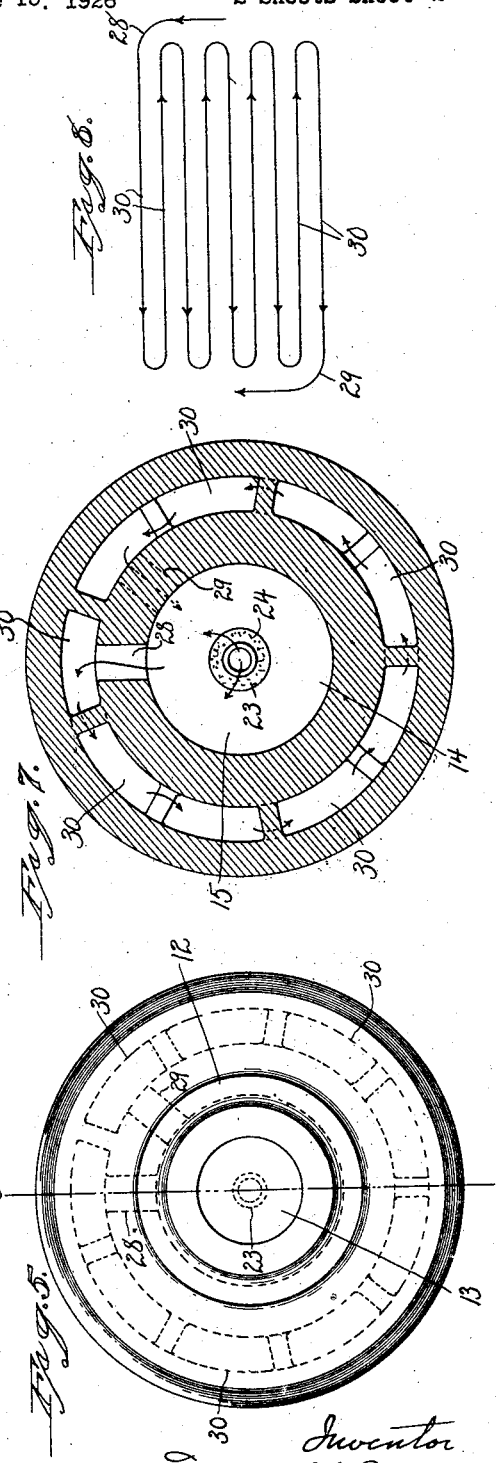
Inventor
Fernley H. Banbury Patented Dec. 6, 1927.

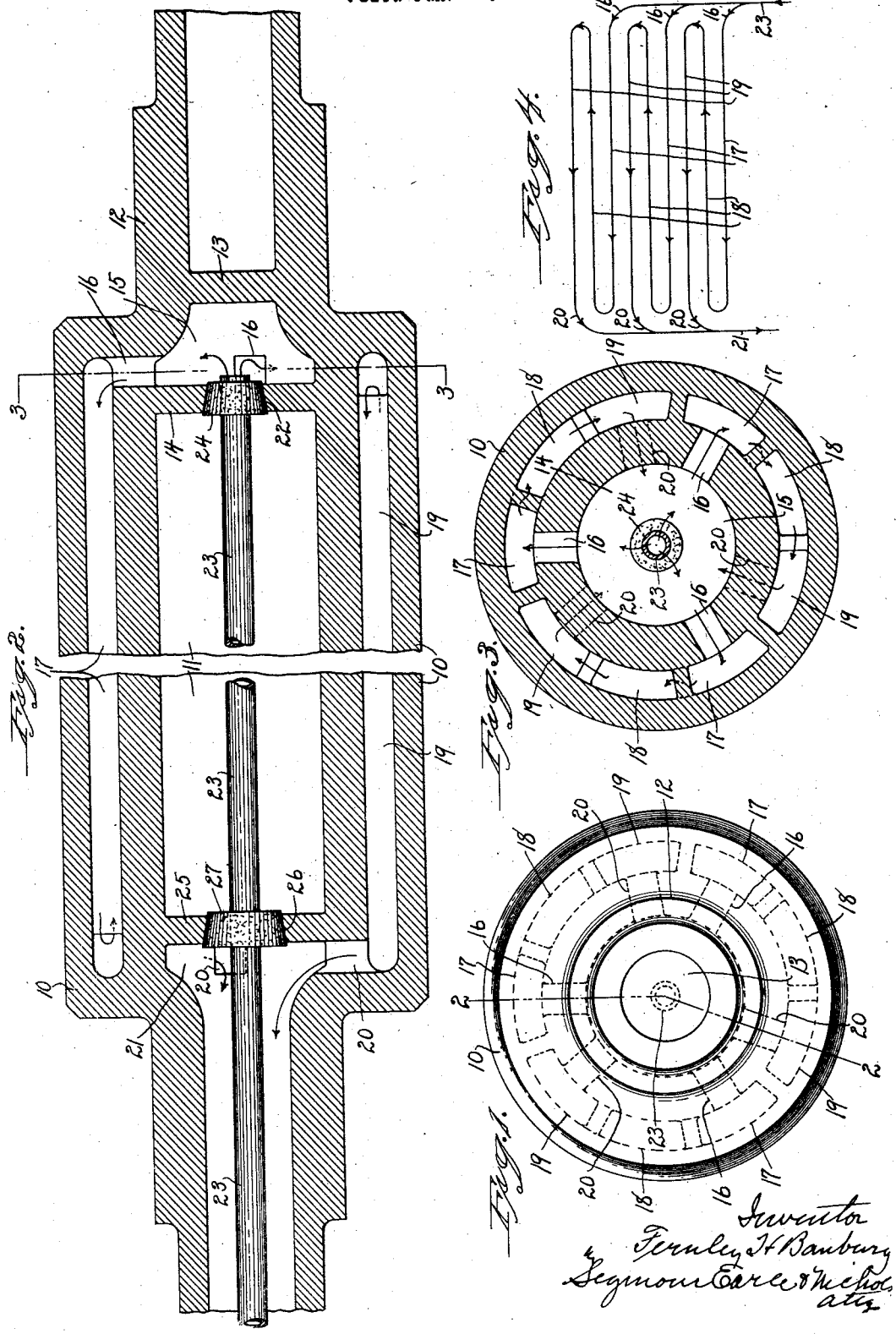

UNITED STATES PATENT OFFICE.

1,651,502

FERNLEY H. BANBURY, OF ANSONIA, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT.

HEAT-EXCHANGE ROLL.

Application filed June 15, 1926. Serial No. 116,083.

Fig. 1 is an end view of a heat exchange roll constructed in accordance with my invention;

Fig. 2 is a longitudinal sectional view of the same;

Fig. 3 is a sectional view on the line 3—3 of Fig. 2;

Fig. 4 is a diagrammatic view, showing the cooling passages arranged in a plurality of series;

Fig. 5 is an end view of a modified form of my invention;

Fig. 6 is a longitudinal sectional view of the same;

Fig. 7 is a sectional view on the line 7—7 of Fig. 6; and

Fig. 8 is a diagrammatic view, showing the flow of water through passages arranged in a single series.

This invention relates to improvement in heat exchange rolls, that is, rolls used, for instance, in rubber-mixing and rubber-calendering rolls. It is desirable that these rolls should be cool and various attempts have been made to cool them by jets of water, but as the walls of the roll are thick, the water is not effective in reducing the temperature at the surface of the rolls. The object of this invention is to form one or more series of channels within the shell of the roll and, consequently, nearer to the surface thereof, and the invention consists in the construction as hereinafter described and particularly recited in the claims.

In carrying out my invention, I employ a roll 10 of desired size and with the usual central chamber 11. At what, for convenience, I will call the "forward" end 12 of the roll is a stop 13, and in rear of it is a wall 14 forming a forward chamber 15. From this forward chamber 15 inlet-ports 16 open into passages 17, which extend to the rear end of the roll, where they are connected with other passages 18, and these passages 18 are connected with passages 19, ending in outlet-ports 20 opening into the rear end 21 of the roll,—in other words, forming a multiple series of passages. The number of series will depend upon the size of the rolls. The wall 14 has a central opening 22 for the passage of a water-pipe 23, which enters the rear end of the roll in the usual manner of water-cooled rolls, and preferably on the forward end of the pipe will be a plug 24 to close the opening 22, and preferably at the rear end of the roll there will be a wall 25 formed with a central opening 26 a little larger than the hole 22 in the forward wall, and on the pipe 23 I place another plug 27 to close the opening 26, so that the water will not enter the central chamber 11. Water being admitted through the pipe 23 passes back and forth through the passages and, by rapidly moving, the water cools the surface of the roll and does not itself become heated to any extent, and is discharged in the usual manner at the rear end of the roll.

Instead of having a multiple series of passages, as indicated in Figs. 1 to 4 of the drawings, the passages 30 may be arranged end to end in a single series, having an entry port 28 at the forward end and an outlet-port 29 at the rear end, as indicated in Figs. 5 to 8 of the drawings, the passage of the water being as indicated in Fig. 8. In either construction, a small volume of water is employed, but with high speed, and the passage of the water is adjacent to the outer surface of the roll which it is desired to cool.

I claim:

1. A heat exchange roll formed with a central chamber, walls at opposite ends thereof, openings through said walls, a chamber forward of the front wall, a pipe extending through said walls and opening into said front chamber, a series of passages extending from front to rear adjacent to the outer surface of the roll, a port from said chamber into one of said passages, said passages connected in series and discharging at the rear end of the roll.

2. A heat exchange roll formed with a central chamber, walls at opposite ends thereof, openings through said walls, a chamber forward of the front wall, a series of passages extending from front to rear adjacent to the outer surface of the roll, a port connecting the forward chamber with the forward end of one of the passages, and a port opening out of the rear end of one of the passages, a pipe extending through said wall and discharging into the front chamber, and plugs on said pipe closing the openings in the said walls.

In testimony whereof, I have signed this specification.

FERNLEY H. BANBURY.